United States Patent [19]

Howell, Jr.

[11] 3,995,725
[45] Dec. 7, 1976

[54] HANGER FOR CONDUCTOR RAILS

[76] Inventor: Alleyne C. Howell, Jr., c/o Howell Corp., 1180 Stratford Road, Stratford, Conn. 06497

[22] Filed: Oct. 28, 1975

[21] Appl. No.: 626,372

[52] U.S. Cl. .............................. 191/23 A; 191/32; 191/40
[51] Int. Cl.² ....................................... B60M 1/34
[58] Field of Search .................. 104/200; 105/148; 174/40 CC, 68 B, 72 B; 191/22 R, 23 R, 23 A, 29 R, 30, 32, 33 R, 35, 40, 47; 248/58, 68 R

[56] References Cited

UNITED STATES PATENTS

| | | | |
|---|---|---|---|
| 2,226,462 | 12/1940 | Ensign | 191/35 |
| 2,912,526 | 11/1959 | Hermann et al. | 191/23 A |
| 2,991,336 | 7/1961 | Shaw et al. | 191/30 X |
| 3,882,978 | 5/1975 | Cookston | 191/32 |

*Primary Examiner*—Stephen G. Kunin
*Attorney, Agent, or Firm*—H. Gibner Lehmann; K. Gibner Lehmann

[57] ABSTRACT

A hanger for supporting single or multiple conductor rails in a rail-type electrification system, comprising a cross support member extending transversely of the rails and one or more spring clips carried by the member and having legs adapted to clamp against opposite faces of the rails so as to support them in operative positions. Each clip is movable on the member between extended and retracted positions, and has resilient latching fingers which cooperate with two sets of shoulders on the member. One set of shoulders prevents inadvertent removal of the clip when it is disposed in its extended position, and the other set operates to lock the clip in its retracted or operative position. In the extended clip position, the legs of the clip are separable an extent to permit insertion of a conductor rail therebetween. After insertion of the rail, the clip is driven to its retracted position, wherein the legs are engaged by wall portions of the support member and thus prevented from spreading and inadvertently releasing the conductor rail. The clip is held in this retracted position by the engagement of its latching fingers and the one set of shoulders of the support member. The arrangement is such that installation involves merely pulling a clip from retracted to extended position, and inserting a rail into the clip, after which the assemblage is manually seated in the cross support member by means of a hammer blow or gentle urging by a pair of pliers, etc.

16 Claims, 17 Drawing Figures

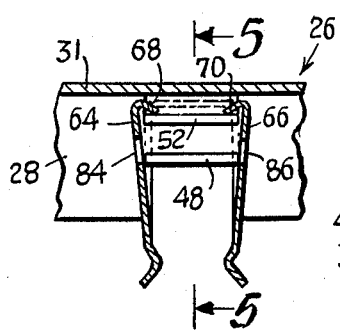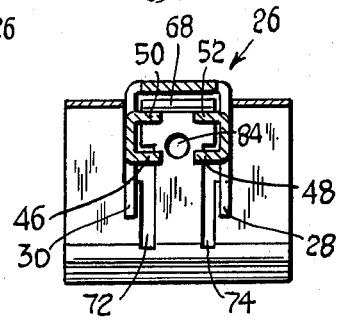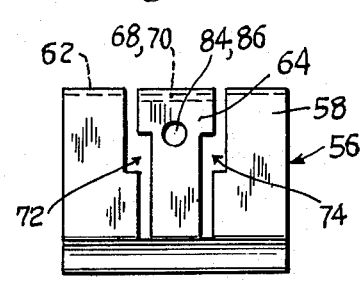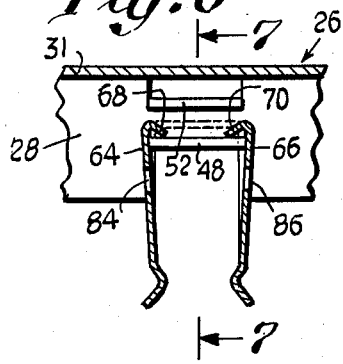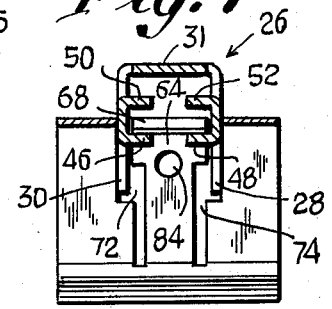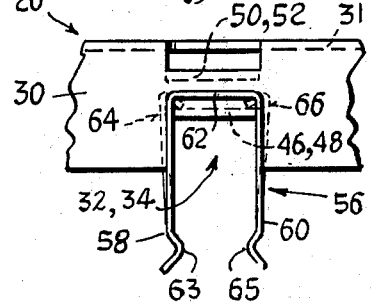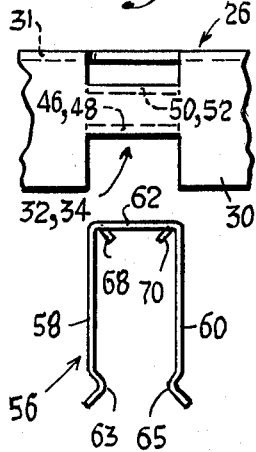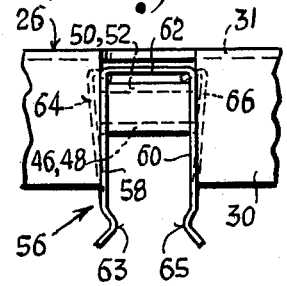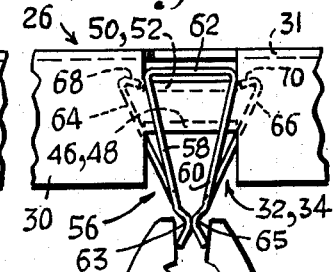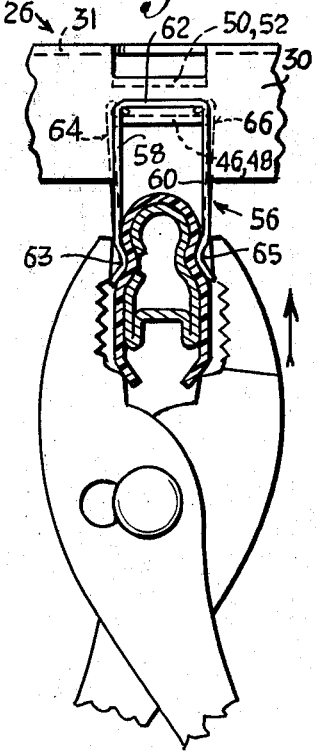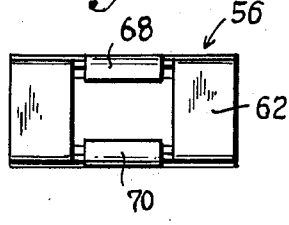

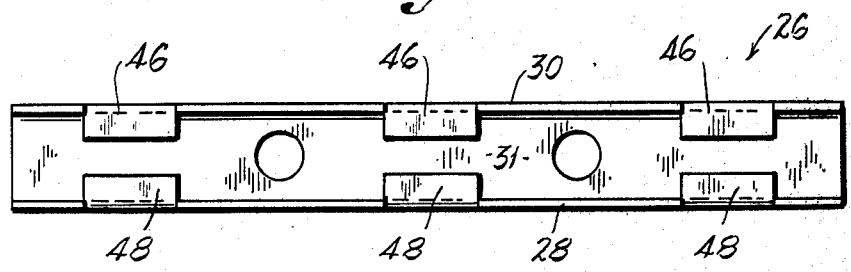
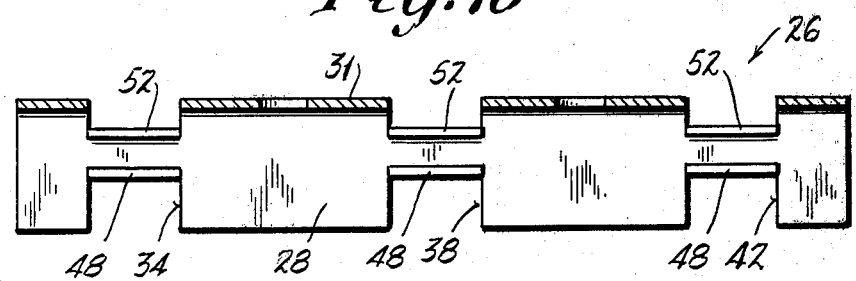
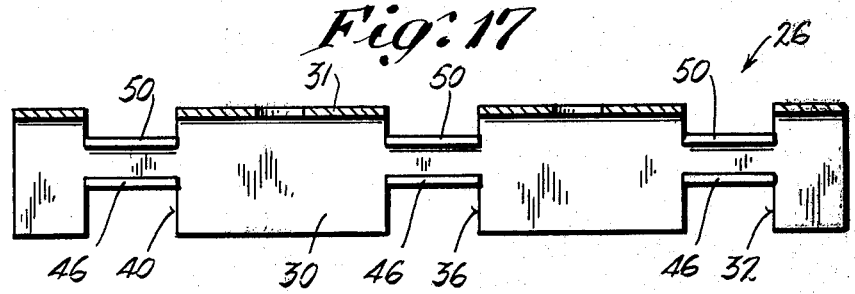

HANGER FOR CONDUCTOR RAILS

CROSS REFERENCES TO RELATED APPLICATIONS

Co-pending application of Alleyne C. Howell, Jr., U.S. Ser. No. 603,149, filed Aug. 8, 1975, entitled "Rail Construction For Rail-Type Electrification Systems".

BACKGROUND

This invention relates generally to rail electrification systems, and more particularly to hanger devices for suspending conductor rails in operative relation, forming a track for engagement by conductor shoes.

In the past, numerous rail hanger devices have been proposed and produced. A number of these consisted of a transverse cross bar from which there were suspended multiple clamps each having flange portions which engaged opposite sides of the conductor rail being supported. The latter typically had elongate, V-shaped grooves in its opposite sides, into which the similarly shaped portions of the flanges were seated. After insertion of the conductor rail into the clamp, the flanges were drawn together, as by tightening a bolt extending through both pieces.

While this arrangement operated satisfactorily, it had several disadvantages. Such conductor rail assemblages were usually suspended overhead from beams and were frequently not readily accessible to the worker without the use of a ladder or other platform. Accordingly, it was often found to be awkward or difficult to loosen and tighten the screws associated with such clamps. Operations of this type often required the use of both hands while balancing oneself on a ladder, this resulting in increased installation time and presenting a hazard to the worker. In addition, the worker had to judge how much to pull up on the screws, which had to be sufficiently tight to insure that the rails would not become loose or drop down. At the same time it was found to be desirable to not clamp the rails too tightly, whereby they could slide longitudinally in the clamps, with the normal expansion and contraction due to temperature. Excessive tightening of the clamps caused the rails to bow when they expanded, thus disrupting the proper operation and tracking of the collector shoes.

SUMMARY

The above disadvantages and drawbacks of prior rail suspension systems are obviated by the present invention, which has for an object the provision of a novel and improved rail hanger structure for rail-type electrification systems, which is especially simple in its construction, reliable in operation, and which greatly simplifies the time and effort required during installation. A related object of the invention is the provision of a rail hanger structure as above, which provides a positive retention of the rail while at the same time enabling limited relative sliding movement thereof with respect to the hanger, such that changes in the length of the rail due to temperature fluctuations do not result in bowing or in misalignments with respect to the collector shoes.

Still another object of the invention is the provision of an improved rail hanger construction wherein the rail can be quickly and easily assembled to the hanger with a minimum of tools, such as a single pair of pliers, and without the need for nuts and bolts or special wrenches therefor.

The above objects are accomplished by the provision of a hanger construction for supporting conductor rails in a rail-type electrification system, comprising a cross support member extending transversely of the rails and one or more spring clips carried by the member and having legs adapted to clamp against opposite sides of the rails to support them in parallel relation. The clips are shiftable on the member during installation, between extended and retracted positions, and include resilient latching fingers which cooperate with two sets of shoulders on the member. One set of shoulders operates to lock the clip in its retracted position, while the other set prevents inadvertent removal of the clip when it is disposed in its extended position. In such latter position, the legs of the clip are separable an extent to permit insertion of a conductor rail therebetween. Following insertion, the clip is driven to its retracted position. Means are provided on the member and clip for locking the legs of the latter to prevent them from spreading and releasing the conductor rail when the clip is in its retracted or operative position. The clip is held in this position by the engagement of its latching fingers with one set of shoulders of the member. The arrangement is such that installation of a rail involves merely the pulling of a clip from retracted to extended position, placement of a rail into the clip, and thereafter a seating of the assembly in retracted position on the cross support member by means of a hammer blow or a gentle urging by a pair of pliers, etc.

Other features and advantages will hereinafter appear.

In the drawings, illustrating a preferred embodiment of the invention:

FIG. 4 is a fragmentary sectional view taken on line 4—4 of FIG. 3, showing the spring clip in its retracted, locking position on the cross support member, but with the conductor rail omitted.

FIG. 5 is a fragmentary sectional view taken on line 5—5 of FIG. 4.

FIG. 6 is a view like FIG. 4, except showing the spring clip in its extended position on the cross support member.

FIG. 7 is a fragmentary sectional view taken on line 7—7 of FIG. 6.

FIG. 8 is a side elevational view of the spring clip, per se, of the hanger construction of FIGS. 1-7.

FIG. 9 is a fragmentary view of the cross support member and spring clip associated therewith, illustrating one step or stage of the assembly and installation of the hanger construction of the present invention.

FIG. 10 is a fragmentary view like FIG. 9, showing a second step or stage in the assembly of the hanger construction.

FIG. 11 is a fragmentary view like that of FIGS. 9 and 10, showing a third step or stage in the assembly of the hanger construction.

FIG. 12 is a fragmentary view like that of FIGS. 9-11, showing a fourth step or stage in the assembly of the hanger construction.

FIG. 13 is a fragmentary view like that of FIGS. 9–12, showing a fifth step or stage in the assembly of the hanger construction.

FIG. 14 is a top plan view of the spring clip, per se, of FIG. 8.

FIG. 15 is a bottom plan view of the cross support member portion of the hanger construction of the present invention.

FIG. 16 is a vertical section of the cross support member, taken on line 16—16 of FIG. 3, and with the rails and spring clips omitted.

FIG. 17 is a vertical section of the cross support member, taken on line 17—17 of FIG. 3, and with the rails and spring clips omitted.

Figure 1:
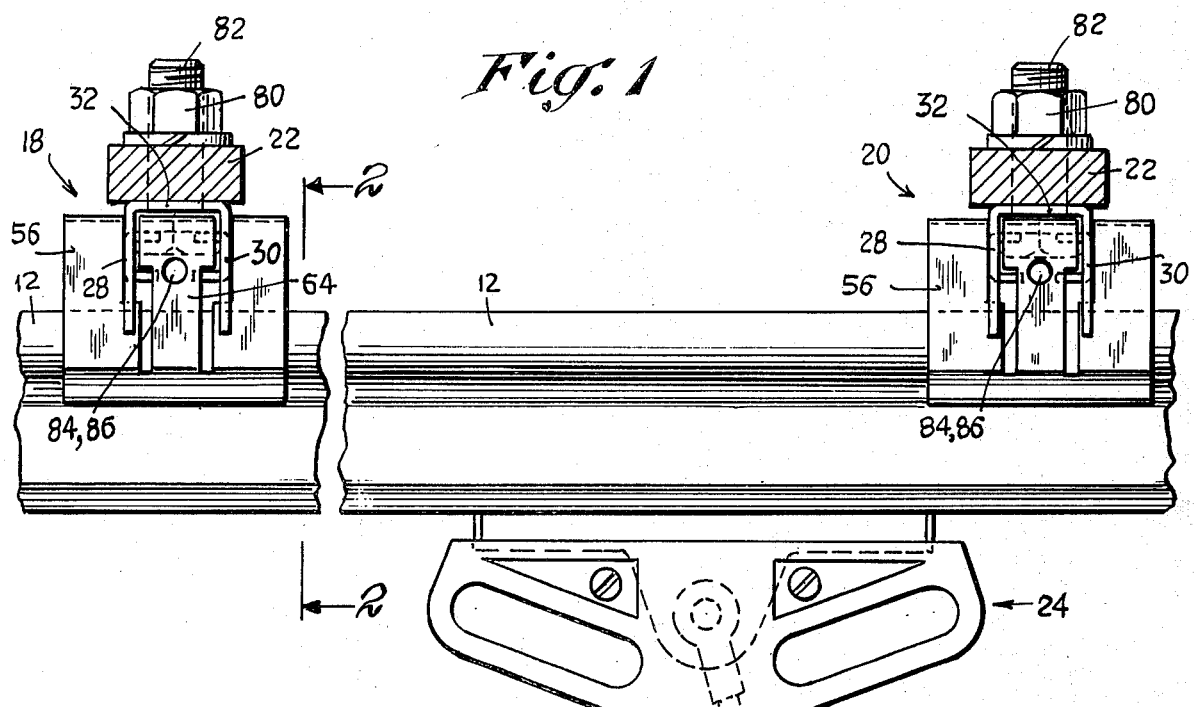
FIG. 1 is a side elevational view of a rail electrification system employing multiple parallel conductor rails, showing a typical collector shoe in engagement with one conductor rail, and incorporating the rail hanger construction of the present invention, comprising a cross support member and multiple spring clips carried thereby.
Figure 2:
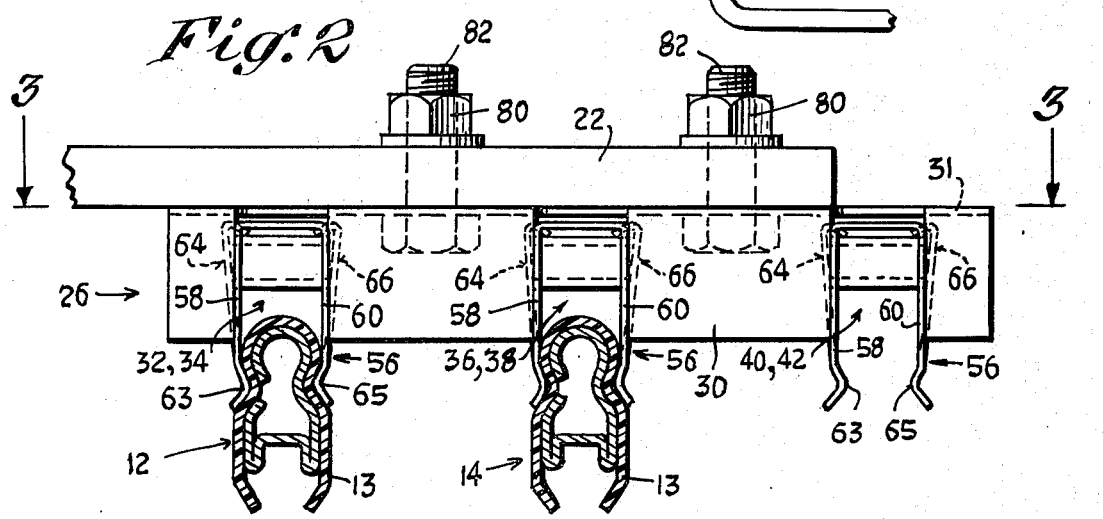
FIG. 2 is a vertical section taken on line 2—2 of FIG. 1.
Figure 3:
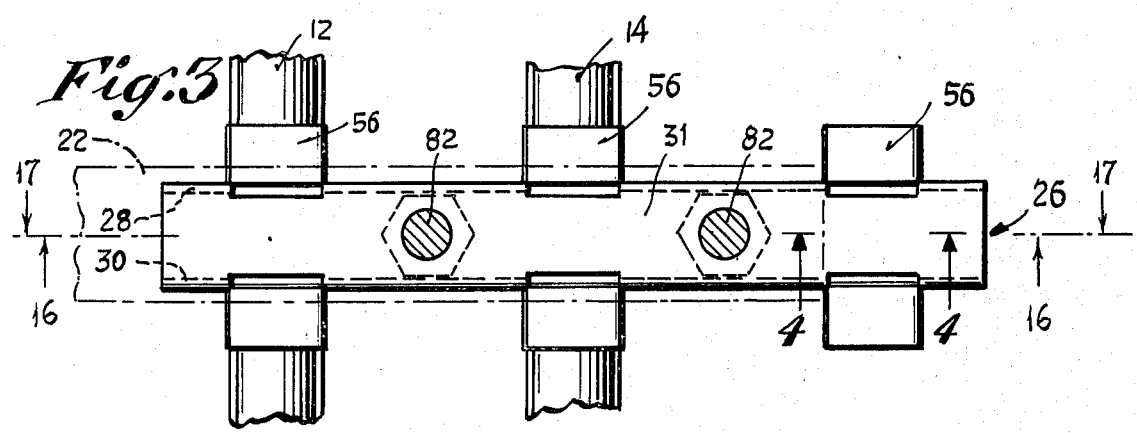
FIG. 3 is a section taken on line 3—3 of FIG. 2.

Referring to FIGS. 1–3, there is illustrated a rail electrification system comprising multiple conductor rails 12, 14 which are suspended in parallel relation from hangers 18, 20 respectively. The rails 12, 14 each have plastic insulating jackets 13 which respectively extend around the metal track portion of the rails and insulate the latter from the hangers. The latter are mounted on a bracket 22 which is secured to a beam (not shown) or other supporting surface of a building. The conductor rails 12, 14 are each adapted to be engaged by a collector shoe assemblage 24, this being similar in construction to those illustrated and described in my U.S. Pat. No. 3,525,823 dated Aug. 25, 1970 and entitled ELECTRICAL COLLECTOR FOR CONDUCTOR RAILS. Only one assemblage 24 is shown in FIG. 1 in the interest of clarity.

Referring to FIGS. 1–7, and 15–17 and in accordance with the present invention, the improved hanger construction comprises a transverse cross support member 26 which is preferably constituted as a channel, having a pair of flange portions 28, 30 and a connecting web portion 31. The flanges 28, 30 are provided with pairs of aligned notches 32, 34; 36, 38; and 40, 42.

Referring to FIGS. 5, 16 and 17, the channel 26 includes two sets of shoulders 46, 48 and 50, 52, the set 46, 48 being adjacent the open end of the channel 26 and hereinafter referred to as retainer shoulders; the other set 50, 52 is adjacent to but spaced from the web portion 31 of the channel 26, and are hereinafter referred to as locking shoulders. Both sets of shoulders are integral with the member 26 and are formed by stamping the sheet from which the member is formed, prior to its being bent into a channel. Disposed at the other pairs of notches, 36, 38 and 40, 42 are sets of shoulders similar to those described above.

Further, in accordance with the present invention there is provided a unique spring clip 56, shown in FIGS. 8 and 14, which is receivable in the notch pairs 32, 34, the pair 36, 38 or the pair 40, 42, and adapted to be held captive therein, once installed. The clip includes a pair of legs 58, 60 which are connected by a web 62, the clip being constituted as a single integral unit and fabricated from spring steel.

Disposed at the ends of the legs are elongate retainer beads 63, 65 which are adapted to be received in similarly shaped grooves in the opposite faces of an insulated (sheathed) conductor rail, as will be described below. Integral with the legs 58, 60 are resilient spring latching fingers 64, 66 which extend toward the web 62 and have inwardly extending hook formations 68, 70 respectively, both of which are adapted to engage the sets of shoulders 46, 48 or 50, 52, one set at a time. The finger 64 is separated from the remainder of the leg 58 by sets of clearance spaces 72, 74. Similar clearance spaces separate the finger 66 from the remainder of the leg 60. The edges of the walls defining the notches 32, 34 are received in these spaces, to enable the legs 58, 60 of the clip to be spaced an extent, during insertion of a conductor rail between the legs, as will be described below.

The operation and installation of the improved hanger construction of the present invention may now be understood by referring to FIGS. 9–13 which show various steps in the installation of a typical conductor rail. The cross member itself is secured by nuts and bolts 80, 82 to the bracket 22, prior to the installation of the rails 12, 14. It is noted that each of the notch pairs 32, 34; 36, 38 and 40, 42 in the member is adapted to carry a spring clip 56. At the factory where the hanger is manufactured, the three clips 56 are inserted in their respective notch pairs to the position illustrated in FIG. 10, wherein the hook formations 68, 70 have by-passed both the retainer shoulders 46, 48 and the locking shoulders 50, 52. During such insertion, the hook formations 68, 70 cam the latching fingers 64, 66 respectively outwardly to facilitate such by-passing.

At the location where installation is to be made, the cross support member is first bolted in place; next, the clip 56 can be grasped with a pliers in the manner of FIG. 11 wherein the legs are squeezed together. As this occurs, the retainer shoulders 46, 48 are engaged by the fingers 64, 66, causing the hook formations 68, 70 to be urged outwardly. This outward movement enables the hook formations to by-pass the locking shoulders 50, 52, and permits withdrawal of the spring clip to the extended position illustrated in FIG. 12, wherein the hook formations 68, 70 engage the retainer shoulders 46, 48. It is noted that as the clip is withdrawn, the fingers approach one another an extent as permitted by their engagement with the shoulders 46, 48. The position of FIG. 12 is hereinafter referred to as the extended position of the clip on the cross member. In this position, the legs 58, 60 are capable of limited separation, due to the clearance spaces 72, 74 in the clip. The particular conductor rail can thus be inserted into the clip until the beads 63, 65 seat in the longitudinal grooves in the opposite faces of the rail. Following insertion, the assemblage consisting of the clip and rail can be grasped with a pliers as shown in FIG. 13, and urged upwardly into the cross member 26 to the retracted position (shown in FIG. 2). As this is done, the hook formations 68, 70 will cam the latching spring fingers 64, 66 respectively outwardly an extent, until they by-pass and become latched behind the shoulders 50, 52. It is noted that the clearance spaces 72, 74 of the clip 56 which in the extended position, received the edge portions of the flanges 28, 30 defining the notches 32, 34; 36, 38; or 40, 42 have been shifted with respect to the latter. As a result, outward yielding of the legs 58, 60 of the spring clip can no longer occur in this retracted position. The conductor rail is thus firmly held in position due to the clamping action of the retainer beads 63, 65 in the rail grooves. In the appended claims, the term conductor rail is intended to cover either the metal track by itself which is directly engaged by the collector shoe, or the track with its insulating jacket 13 which conforms to the outer contour thereof.

Assuming for some reason that it is desired to remove the rail, there is provided in each of the spring fingers 64, 66 apertures 84, 86 to enable insertion of a screwdriver or awl, such that the finger 64 or 66 can be manually pryed outwardly to enable the hook formations 68, 70 to by-pass the locking shoulders 50, 52. This is usually not required, however, unless a particular rail must be removed or replaced.

From the above it can be seen that I have provided a novel and improved rail hanger construction which is both simple and reliable, and which greatly facilitates assembly of multiple conductor rails by eliminating the use of nuts and bolts in securing the spring clips to the cross support and retaining the rails in the clips. The fit between the clip and the rail is sufficiently loose to enable the latter to slide a limited extent, to thereby accommodate changes in the length of the rail due to temperature variations, all without bending or warping of the rail. The device is thus seen to represent a distinct advance and improvement in the technology of rail electrification systems.

Variations and modifications are possible without departing from the spirit of the invention.

I claim:

1. A hanger construction for supporting a conductor rail in rail-type electrification systems, comprising in combination:
   a. a cross support member adapted to extend transversely of the conductor rail,
   b. a U-shaped spring clip having opposed legs, carried by the cross support member and adapted to receive the conductor rail between the legs thereof,
   c. cooperable holding means on the cross member and spring clip for holding the latter in either extended or retracted positions on the cross member,
   d. the legs of the clip being separable an extent when in the extended position to receive between them said conductor rail, and
   e. cooperable blacking means on the cross support member and spring clip, blocking the legs on the latter to prevent them from spreading and releasing the conductor rail when the clip is in its retracted position on the cross member.

2. The invention as defined in claim 1, wherein:
   a. said rail has a longitudinal recess extending for a substantial length therealong,
   b. said spring clip having a projection on one of its legs, adapted to be received in said recess for holding the rail captive in the clip.

3. The invention as defined in claim 1, wherein:
   a. said cooperable holding means comprises a pair of locking shoulders on the cross support member, and
   b. a pair of resilient latching fingers including hooked ends engageable with the locking shoulders of the support member so as to secure the clip in the retracted position on the cross member.

4. The invention as defined in claim 3, wherein:
   a. said hooked ends include camming surfaces adapted to cam outwardly the latching fingers as the hooked ends by-pass the locking shoulders.

5. The invention as defined in claim 3, wherein:
   a. said cooperable holding means comprises a pair of retainer shoulders on the cross support member, spaced from said locking shoulders,
   b. said retainer shoulders being engageable with the hooked ends of the latching fingers to secure the clip against inadvertent removal from its extended position.

6. The invention as defined in claim 1, wherein:
   a. said U-shaped clip has a connecting web portion joining the legs,
   b. said cooperable holding means including a pair of latching fingers on the clip, having free ends extending toward said connecting web portion from the legs.

7. The invention as defined in claim 6, wherein:
   a. said clip and fingers are integral with one another and are constituted as a single metal stamping.

8. The invention as defined in claim 1, wherein:
   a. said cross support member comprises a channel having oppositely disposed flanges,
   b. said flanges having a pair of aligned notches to receive the spring clip,
   c. said cooperable blocking means comprising the flange edges defining said notches, said edges being engageable with the legs of the spring clip to prevent spreading of the latter when the clip is disposed in its retracted position.

9. The invention as defined in claim 8, wherein:
   a. the legs of said spring clip include clearance recesses to receive the flange edges defining said notches when the clip is disposed in its extended position, tnereby permitting limited spreading of the legs when a conductor rail is inserted therein.

10. The invention as defined in claim 3, wherein:
    a. said latching fingers have apertures, respectively, to receive a tool for prying the fingers outwardly and enabling bypass of the hooked ends and the locking shoulders of the support member, in order to release the spring clip from its retracted position.

11. The invention as defined in claim 5, wherein:
    a. said cross support member is constituted as a channel having coextensive flange portions and a connecting web portion,
    b. said retainer shoulders and locking shoulders being disposed on the inner surfaces of said flange portions and being integral therewith.

12. A hanger construction supporting a conductor rail in rail-type electrification systems, comprising in combination:
    a. a cross channel member comprising a pair of flanges and a central web connecting the flanges, said flanges having notches which are aligned with each other,
    b. a U-shaped spring clip having a pair of oppositely disposed legs, carried by the cross member and extending into said notches, said spring clip being movable between extended and retracted positions with respect to the member, and
    c. means on the spring clip for receiving and gripping said conductor rail,
    d. the flanges of the cross channel member having retainer shoulders at the notches thereof,
    e. said spring clip having a pair of resilient latching fingers including hooked ends engageable with the retainer shoulders of the channel member to retain the spring clip against inadvertent removal from the extended position thereon,
    f. the flanges of the cross channel member having a pair of locking shoulders adjacent and spaced from the connecting web,
    g. said hooked ends of the latching fingers being sloped and adapted to cam them apart when they are brought into engagement with the locking shoulders of the cross channel member whereby the hooked ends can by-pass said locking shoulders and latch behind them as the spring clip is shifted from its extended position to its retracted position on the cross channel member.

13. The invention as defined in claim 12, wherein:
a. said spring clip includes a connecting web portion joining the legs,
b. said latching fingers being integral with the legs of the spring clip, and extending in directions toward the connecting web portion of the spring clip.

14. The invention as defined in claim 12, wherein:
a. the legs of said spring clip have clearance recesses to receive the flange edges defining said notches when the clip is disposed in its extended position, thereby permitting limited spreading of the legs of the clip when a conductor rail is inserted therein.

15. The invention as defined in claim 12, wherein:
a. the flange edges defining the notches are engageable with the legs of the spring clip to prevent spreading of the latter and inadvertent removal of the conductor rail when the clip is disposed in its retracted position.

16. The invention as defined in claim 12, wherein:
a. the spring fingers have apertures, respectively, to receive a tool for prying the fingers outwardly and enabling by-pass of the hooked ends and the locking shoulders, in order to release the clip from its retracted position.

* * * * *